US007765511B1

(12) United States Patent
Perez et al.

(10) Patent No.: US 7,765,511 B1
(45) Date of Patent: Jul. 27, 2010

(54) COMPENSATION FOR PERFORMANCE VARIATION IN INTEGRATED CIRCUITS

(75) Inventors: Christopher Perez, Severn, MD (US); Arifur Rahman, San Jose, CA (US); Christopher H. Kingsley, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 333 days.

(21) Appl. No.: 11/975,960

(22) Filed: Oct. 22, 2007

(51) Int. Cl.
*G06F 17/50* (2006.01)
*H03K 17/693* (2006.01)

(52) U.S. Cl. .............. 716/16; 716/6; 716/4; 716/10; 716/12; 703/19

(58) Field of Classification Search ............. 716/3, 716/5, 8–14, 16–17
See application file for complete search history.

(56) References Cited

U.S. PATENT DOCUMENTS

2009/0278564 A1* 11/2009 Dehon et al. ............... 326/9

OTHER PUBLICATIONS

"A yield and speed enhancement scheme under within-die variations on 90nm LUT array", by Kazuya Katsuki, Manabu Kotani, Kazutoshi Kobayashi, and Hidetoshi Onodera, @2005 IEEE.*

* cited by examiner

*Primary Examiner*—Paul Dinh
*Assistant Examiner*—Nha T Nguyen
(74) *Attorney, Agent, or Firm*—LeRoy D. Maunu; Lois D. Cartier

(57) ABSTRACT

Various approaches are provided for generating an implementation of an electronic circuit design. In one embodiment, a processor-based method implements a design in an integrated circuit or IC (e.g., a programmable logic device. The method includes storing performance-variation data that represents location-based performance variations between logically-equivalent-programmable resources of the IC. The respective stored performance-variation data of at least two logically-equivalent-programmable resources of the IC are compared. The logic of the design is mapped, placed and routed on resources of the IC. The mapping, placing and routing includes, for an implementation of at least one subset of the logic of the design, selecting between the at least two logically-equivalent-programmable resources of the IC based on a result of the step of comparing respective stored performance-variation data of the at least two logically-equivalent-programmable resources. An implementation of the design is generated from the logic of the design placed and routed on the resources of the IC.

16 Claims, 4 Drawing Sheets

COMPENSATION FOR PERFORMANCE VARIATION IN INTEGRATED CIRCUITS

FIELD OF THE INVENTION

The present invention generally relates to compensating for performance variations between similar resources in integrated circuits.

BACKGROUND

Programmable Logic Devices (PLDs) are Integrated Circuits (ICs) that are used to implement digital logic operations according to user configurable input. Example PLDs include Complex Programmable Logic Devices (CPLDs) and Field Programmable Gate Arrays (FPGAs). CPLDs often include several function blocks that are based on programmable logic array (PLA) architecture with sum-of-products logic. A configurable interconnect matrix transmits signals between the function blocks.

An example FPGA includes an array of configurable logic blocks (CLBs) and a ring or columns of programmable input/output blocks (IOBs). The CLBs and IOBs are interconnected by a programmable interconnect structure (routing resources). The CLBs, IOBs, and interconnect structure are typically programmed by loading a stream of configuration data (bitstream) into internal configuration memory cells that define how the CLBs, IOBs, and interconnect structure are configured. The configuration bitstream may be read from an external memory, conventionally an external integrated circuit memory EEPROM, EPROM, PROM, and the like, though other types of memory may be used. The collective states of the individual memory cells then determine the function of the FPGA. A specific type of FPGA uses a look-up-table (LUT)-based CLB. The configuration memory provides input values to a number of multiplexers controlled by inputs to the CLB.

A conventional design process for an integrated circuit, such as an ASIC or an FPGA begins with the creation of the design. The design specifies the function of a circuit design at a schematic or logic level and may be represented using various programmable languages (e.g., VHDL, ABEL or Verilog) or schematic capture programs. The design is synthesized to produce a logical network list ("netlist") supported by the target integrated circuit device. The synthesized design is mapped onto primitive components within the target device (e.g., programmable logic blocks of an FPGA). Placement of the components of the synthesized and mapped design is then performed for the target device. Interconnects (e.g., signal conductors) are routed within the target device for the placed components. Place-and-route procedures sometimes involve optimizations of a design's timing, power consumption, area and any combination thereof. In some instances, timing-based estimations of the design are also provided.

PLD technology is rapidly advancing on many different fronts. One such area of advancement involves increases in speed and density of the resources on a PLD. Much advancement can be credited to improvements in the underlying semiconductor devices forming the various PLD components. For example, transistor technology has seen significant improvements due to smaller transistor sizes. These and other changes, however, are not without their costs.

As the technology evolves, the transistors, and similar IC components, may become increasingly sensitive to process variations. Such increased sensitivity can be attributed to a number of factors including smaller transistors sizes (e.g., width and length), thinner gate oxide, low levels of dopant impurities in the channel, proximity of transistors to other components or well boundaries, and lithographic resolution. Moreover, as device speeds increase, they often become more susceptible to timing variations. Process variations may also result in performance variations between similar interconnects. For instance, variations in metal wire width and height variation, and inter-layer dielectric thickness variation, among other factors, may affect the performance of interconnections. Moreover, a particular interconnection's variation may have a dependency on its location and layout. This is partially due to the fact that the same amount of variation may result in disparate impacts on parts exhibiting different timing requirements.

What is needed is a method by which deviations from ideal process performance in a design configuration in a programmable logic device can be compensated for. The method should derive its compensation data from the performance data of the target programmable logic device and from the configuration data of the design configuration.

SUMMARY OF THE INVENTION

A method is presented by which deviations from ideal process performance in a design implemented in an integrated circuit are compensated for. The method derives its compensation data from performance data of the target integrated circuit and from the design configuration data.

Various approaches are provided for generating an implementation of an electronic circuit design. In one embodiment, a processor-based method implements a design in an integrated circuit (e.g., a programmable logic device (PLD)). The method includes storing performance-variation data that represents location-based performance variations between logically-equivalent-programmable resources of the integrated circuit. The respective stored performance-variation data of at least two logically-equivalent-programmable resources of the integrated circuit are compared. The logic of the design is mapped, placed and routed on resources of the integrated circuit. The mapping, placing and routing includes, for an implementation of at least one subset of the logic of the design, selecting between the at least two logically-equivalent-programmable resources of the integrated circuit based on a result of the step of comparing respective stored performance-variation data of the at least two logically-equivalent-programmable resources. An implementation of the design is generated from the logic of the design placed and routed on the resources of the integrated circuit. The implementation of the design is stored.

In another embodiment, a processor-based method implements a design in an integrated circuit (e.g., a programmable logic device (PLD)). The method includes storing timing data that represents timing variations between logically-equivalent-programmable resources of the integrated circuit, the timing variations correlated to physical locations of the logically-equivalent-programmable resources. A plurality of groups of logically-equivalent-programmable resources are identified that are each distinguishable from other groups of logically-equivalent-programmable resources with regard to respective timing variations, wherein plurality of groups of logically-equivalent-programmable resources are each defined by a performance parameter. A performance-based representation of the design is generated using the stored timing data. The functionality and timing of the design is simulated using the generated-performance-based representation of the design. The results of the simulation are stored.

In another embodiment, a processor-based arrangement implements a design in an integrated circuit (e.g., a programmable logic device (PLD)). The arrangement includes means for storing performance-variation data that represents location-based performance variations between logically-equivalent-programmable resources of the integrated circuit. Means is included for comparing respective stored performance-variation data of at least two logically-equivalent-programmable resources of the integrated circuit. Means is included for mapping, placing and routing logic of the design on resources of the integrated circuit, wherein the mapping, placing and routing includes, for an implementation of at least one subset of the logic of the design, selecting between the at least two logically-equivalent-programmable resources of the integrated circuit based on a result from the means for comparing respective stored performance-variation data of the at least two logically-equivalent-programmable resources. Means is included for generating an implementation of the design from the logic of the design placed and routed on the resources of the integrated circuit. Means is included for storing the implementation of the design.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention provide methods and apparatus for implementing an integrated circuit chip (IC) design. One or more aspects in accordance with the invention are described in terms of a field programmable gate array (FPGA). While specific reference is made to an FPGA, those skilled in the art will appreciate that one or more aspects of the invention may be used for designing other types of integrated circuits, such as complex programmable logic devices (CPLDs), application specific integrated circuits (ASICs), and the like.

Consistent with one example embodiment of the invention, location-specific variations in the performance of PLD components are determined. A processor-based method is used to compensate for the determined variations during implementation of a design for the PLD. Such compensation may involve using the determined variations during mapping, placement, routing, or simulation of the design. In a specific instance, the variations may include timing differences between CLBs. The method may correlate the timing differences to specific CLBs according to the CLBs' physical location on the IC chip.

Random performance variations often occur between each IC and also between different manufacturing runs of ICs. Performance variations may be determined by implementing various performance tests on ICs. These performance tests are preferably performed on a sufficient number of ICs and/or manufacturing runs to distinguish systematic performance variations from random variations. A specific example of a performance test is the implementation of a number of ring oscillators consisting of LUTs, horizontal doubles, and horizontal hexes. A ring oscillator uses feedback to produce an oscillating signal. In a specific example, the rate of oscillation is dependent upon the speed of the components that define the ring oscillator. Thus, the frequency of oscillation may be used to determine the speed of the components defining the ring oscillator. These and other values may be stored in a database and the information in the database then used to determine systematic performance variations in the PLD.

It has been discovered that some FPGAs exhibit noticeable performance variations at the edges of an IC die. More specifically, LUTs located near the outer edges of such IC dies exhibit variations exceeding 3 percent (e.g., 3 percent slower) when compared to similar LUTs that are located near the center of the IC die. According to various embodiments of the invention, this discovery may be used to improve implementation and/or simulation of designs for the FPGA. For instance, those programmable resources located near the edges of the IC die can be distinguished from those programmable resources located near the center of the IC die. Compensation for this and other types of systematic-performance variances may occur during various stages of a design implementation.

Figure 1:
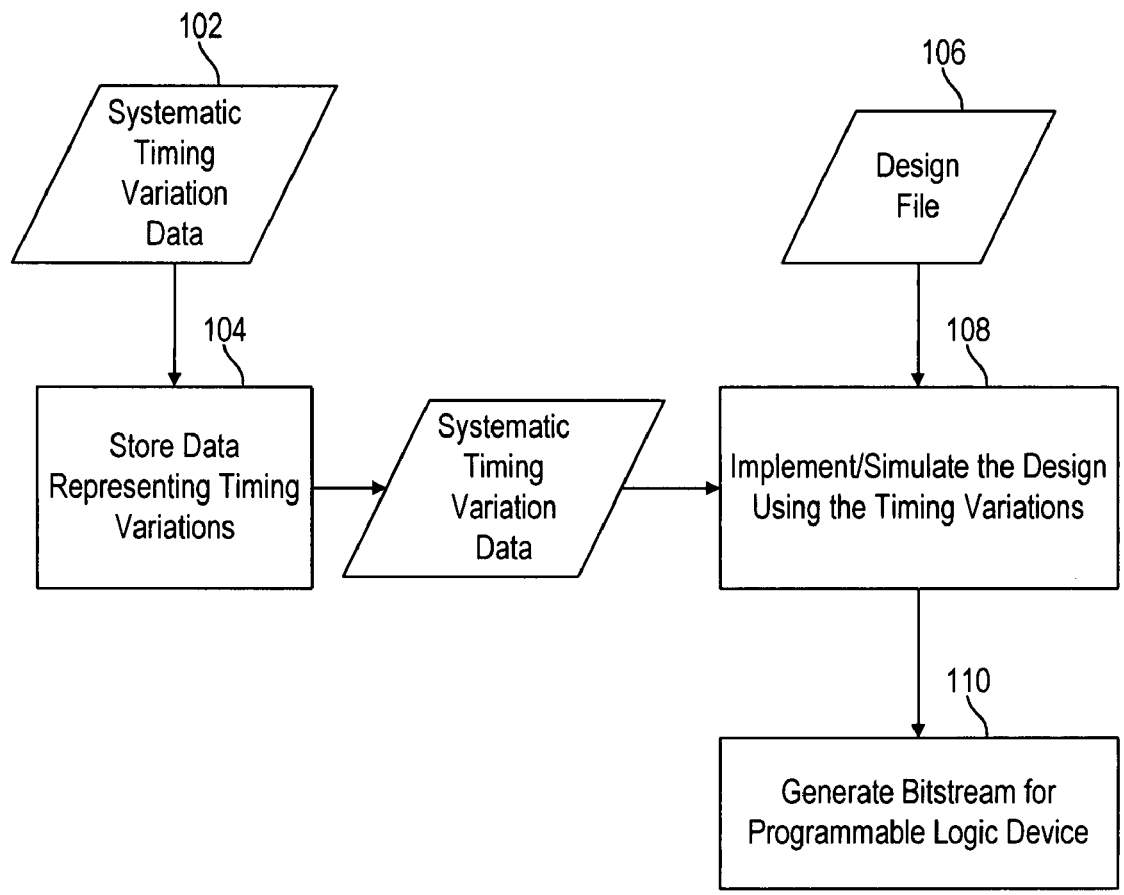
FIG. 1 is a flow diagram for implementing a process in accordance with various embodiments of the invention.

Turning now to the figures, FIG. 1 is a flow diagram for implementing a process in accordance with various embodiments of the invention. Systematic-timing-variation data 102 is stored at block 104. This data specifies variations in the timing of components relative to their physical location on the PLD. That is, two programmable resources/components of the same type (e.g., having essentially equivalent structures) may have different timing values based on the locations of the two components on the PLD. In a specific example, the data is stored as part of an existing speed file that contains timing specific information for the various components of the PLD. In this manner systematic-timing variances between components of the PLD may be stored in a format that is consistent with existing design-implementation software. This may be particularly useful for reducing or eliminating the need for changes to existing synthesis, mapping, placement, routing, and simulation software. Various other techniques are also envisioned. For instance, the data may be stored as a weight factor corresponding to the components and to their respective systematic timing variances. In another instance, various components can be selectively excluded from use.

Design file 106 represents the design to be implemented in the PLD. Numerous formats are acceptable for the design including, but not limited to, programmable languages (e.g., VHDL, ABEL or Verilog) and schematic capture programs. Using the timing-variations, the design is processed (implemented/simulated) for use with the PLD as shown by block 108. This process may include a number of different steps, such as mapping, placing and routing the design for the PLD. An instance of the design can also be created and used for simulation of the design with respect to timing performance and/or functional aspects of the design. At block 108, each of these steps may optionally incorporate the systematic-timing-variation data 102. In one such instance, the components are assigned weight factors according to their physical location and corresponding systematic-timing-variation data 102.

During various stages of the implementation process the weight factors can be used to implement the design. In this manner, faster components may be selected for use before slower components are selected for use. Alternatively, critical portions/paths of the design may be mapped to the faster components, while less-critical portions are mapped to the slower components. In another instance, the components exhibiting the worst performance variations (e.g., the slowest components) may be completely excluded from use. This may be useful for providing a PLD that operates at speeds that exceed those of the slowest components. Ultimately, the implementation process may produce a bitstream for programming the PLD device as shown at block 110.

In a particular instance performance variations may be decomposed into logic and interconnect components for use in mapping and placement. If interconnect delay variation is much larger than logic delay variation, the optimization of interconnects may be weighted more than the optimization of the logic components. For instance, the use of long interconnects may be avoided by careful selection of the logic components. For example, the design may be implemented using a wide fan-in LUT to implement a logic function instead of two smaller LUTs (assuming that two smaller LUTs require interconnections to connect them, adding to delay variation). The decomposition of delay variation may influence the mapping process.

Figure 2:
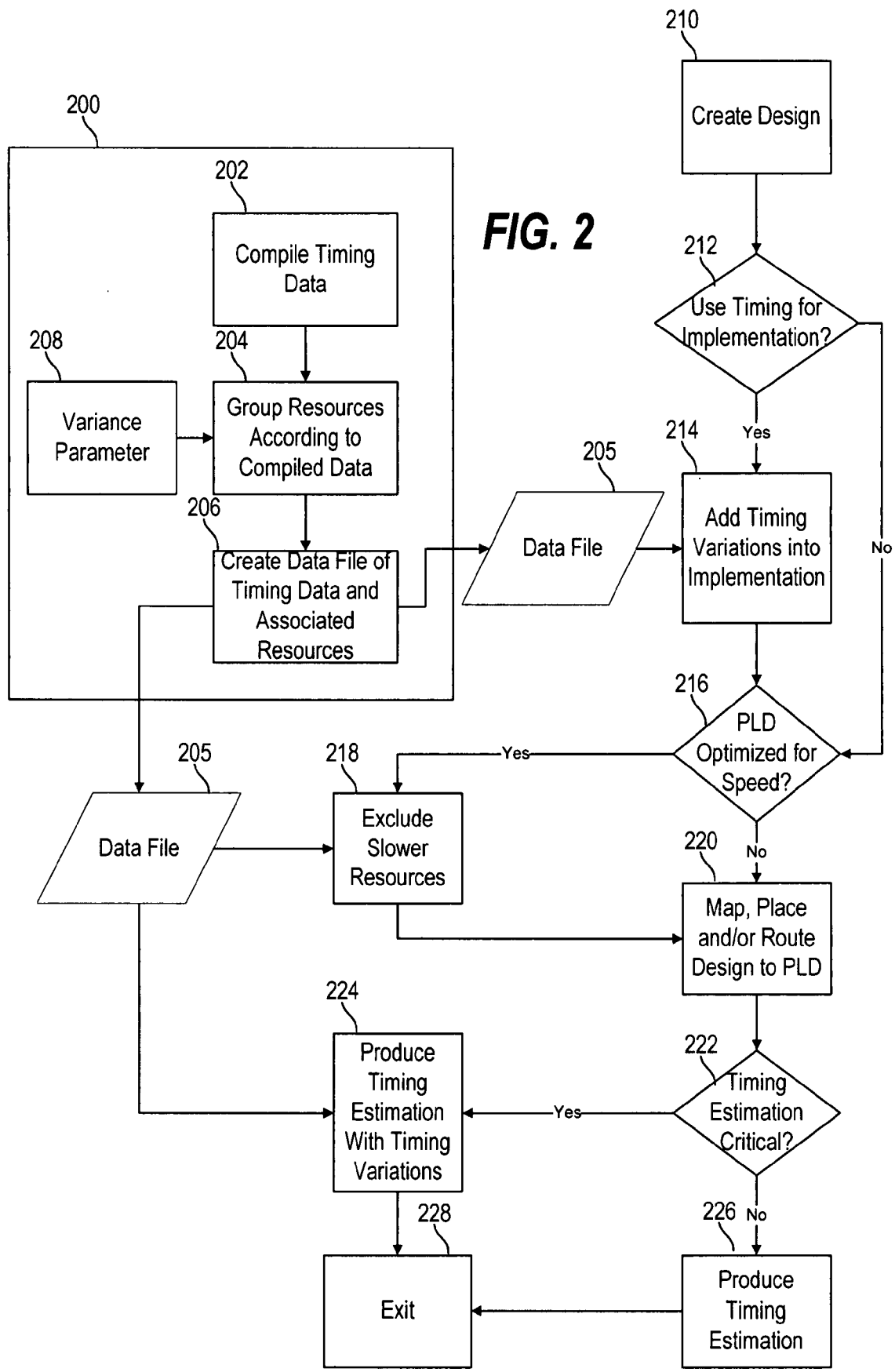
FIG. 2 is a block diagram of an example of a flow diagram for implementing another process in accordance with various embodiments of the invention.

FIG. 2 is a block diagram of an example of a flow diagram for implementing another process in accordance with various embodiments of the invention. FIG. 2 shows portion 200, which can be implemented separate from and prior to the remaining portions of the flow diagram. Portion 200 depicts a specific example of a process for obtaining performance-variation data. At 202, timing data from a number of PLDs is compiled. The timing data may be obtained by configuring the PLD in accordance with a performance-based test. For example, the CLBs/LUTs of a particular PLD could be configured in ring-oscillator configuration. Variations of routing and component combinations could be implemented to identify the source of the delay as it may otherwise be difficult to distinguish between timing variations of a particular CLB/LUT and connection delays of the PLD. For example, the PLD can be configured using a local feedback connection to the CLB/LUT, a horizontal double configuration, or horizontal hex configuration.

In a particular embodiment of the invention, the PLD components are grouped according to their timing variances. A map/place/route tool can then process the components according to their group designation instead of individually processing each component. This can be particularly useful for reducing the processing time necessary for implementing or simulating the design.

One method of grouping the components involves the use of a variance parameter 208. In one instance, the variance parameter represents the granularity of performance variations between groups of components. This can be a simple value, such as a percentage of variation or amount of delay (e.g., picoseconds), or it can be a more complicated function. For example, the variance parameter could be set to 1 percent. Each component would then be assigned to a group corresponding to the compiled-percentage-performance variation for that component. In another example, the variance parameter may specify a number of groups unevenly distributed, such as grouping all components having 0 to 2 percent variance in a first group, all components having 3 percent to 4 percent in a second group and all components exceeding 4 percent into a third group. The variance parameter may also represent grouping criteria that is based upon a physical location within the PLD. For example, it has been discovered that some PLDs exhibit within-die performance variations near the exterior of the PLD die. Thus, it is possible to group the components according to their individual performance variations, physical locations, or a combination thereof. Other implementations are possible including, but not limited to, implementing a minimum performance variation value and grouping those components that do not meet the minimum value.

The results of step 204 are stored in a data file 205 as shown by step 206. This data file can then be used by the design-implementation/simulation tools. In one instance, the data file is a separate file accessible by the design-implementation tools. This may be useful for simple updating of the timing data and also for simple addition of new PLDs to the map/place/route tool. In another instance, the data file may be incorporated directly into the map/place/route tool's executable/data files.

At step 210, the design file is created to include a specification of a circuit design for implementation on a target PLD. At decision step 212 it is determined whether the map/place/route tool is configured to use the timing data during implementation of the design. This option may be a user-configurable selection or determined by the design-implementation tools. The design-implementation tools may determine, for example, whether timing-variation data is available for the targeted PLD. Alternatively, the map/place/route tool may determine whether the design has timing critical portions that would benefit from use of the timing-variation data. It is envisioned that the map/place/route tool could use any number of additional criteria for making the determination.

If it is determined that the timing-variation data is to be used, the data from block 200 is used to correlate any timing variations with the components of the PLD as shown by step 214. The timing variations may then be added into the implementation of the design. This may include using speed files modified by adding timing variations to the file or assigning weight factors, which characterize the timing variations, to PLD components for use by the cost analysis performed by the map/place/route tool. If it is determined that the timing-variation data is not to be used, step 214 may be skipped.

Speed grades for a particular PLD may be selected by the PLD manufacturer (e.g., hard coded into the device or map/place/route tool), or it may be a user-configurable option. If it is determined that the part has been optimized for speed, the timing-variation data is used to exclude the inconsistent components, as shown by step 218. If it is determined that the part has not been optimized for speed, step 218 may be skipped. Thus, at decision step 216 a determination is made as to whether the PLD is to be optimized for speed. In this context, the decision as to whether the PLD is to be optimized for speed may be based upon the speed grade of the target PLD, where a particular speed grade PLD may be inconsistent with some of the timing variations of the components. For example, timing variations that result in components that operate at speeds slower than the selected speed grade may be considered inconsistent and excluded accordingly.

At step 220 the design may be mapped, placed, and routed for the targeted PLD. During this step, the weighting factors assigned in step 214, if any, may be used to optimize the PLD.

At decision step 222 the process determines whether it is critical to more accurately estimate the timing through use of the timing-variation data. The designer may specify with control input to the process whether a more accurate timing estimation is critical. If it is determined that the estimation is critical, the timing-variation data is used to produce a timing estimation that includes the timing-variations as shown by step 224. Otherwise the timing estimation is produced at step 226 without the use of the timing-variation data. The timing estimation can then be used to simulate or otherwise evaluate the design as implemented for the targeted PLD. This timing estimation step 226 may be implemented at various stages of the design implementation. For example, the timing estimation may be implemented either before or after routing of the design to the PLD.

Figure 3:
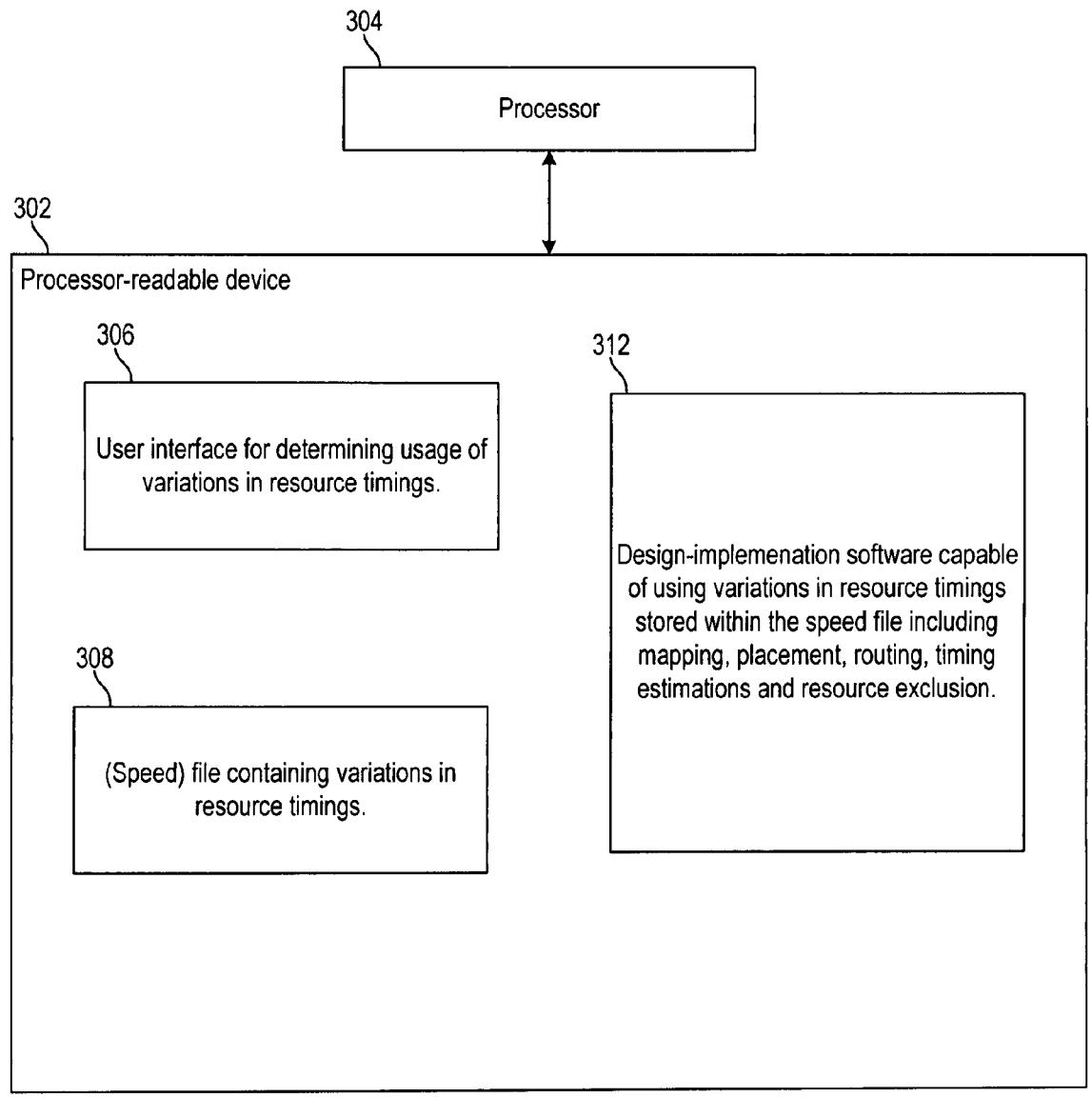
FIG. 3 is a diagram of a processor and machine readable memory in accordance with various embodiments of the invention.

FIG. 3 is a diagram of a processor and processor-readable storage device in accordance with various embodiments of the invention. Processor 304 implements various embodiments of the invention by accessing processor-readable device 302. Processor 304 may be implemented using a single processor or multiple processors. Processor 304 may also be implemented using general-purpose processor(s) configured with specialized software or using one or more specialized processors. Processor-readable device 302 may be implemented using a number of different storage devices including, but not limited to, static memory, nonvolatile memory, various disk drives, compact disks and digital-video-disks.

According to one embodiment of the invention, processor-readable device 302 includes instructions and data 306 for providing a user interface. This user interface may be arranged to allow a user to select how the timing variations are implemented. For instance, the user interface may correspond to one or more of the decision blocks of FIG. 2. Processor-readable device 302 may also include the data file 308 that contains the timing-variation data. Instructions and data 306 and data file 308 may be used by design-implementation software 312 during the design-implementation process including, for example, the steps of mapping, placement, routing, timing estimations and resource exclusion.

Figure 4:
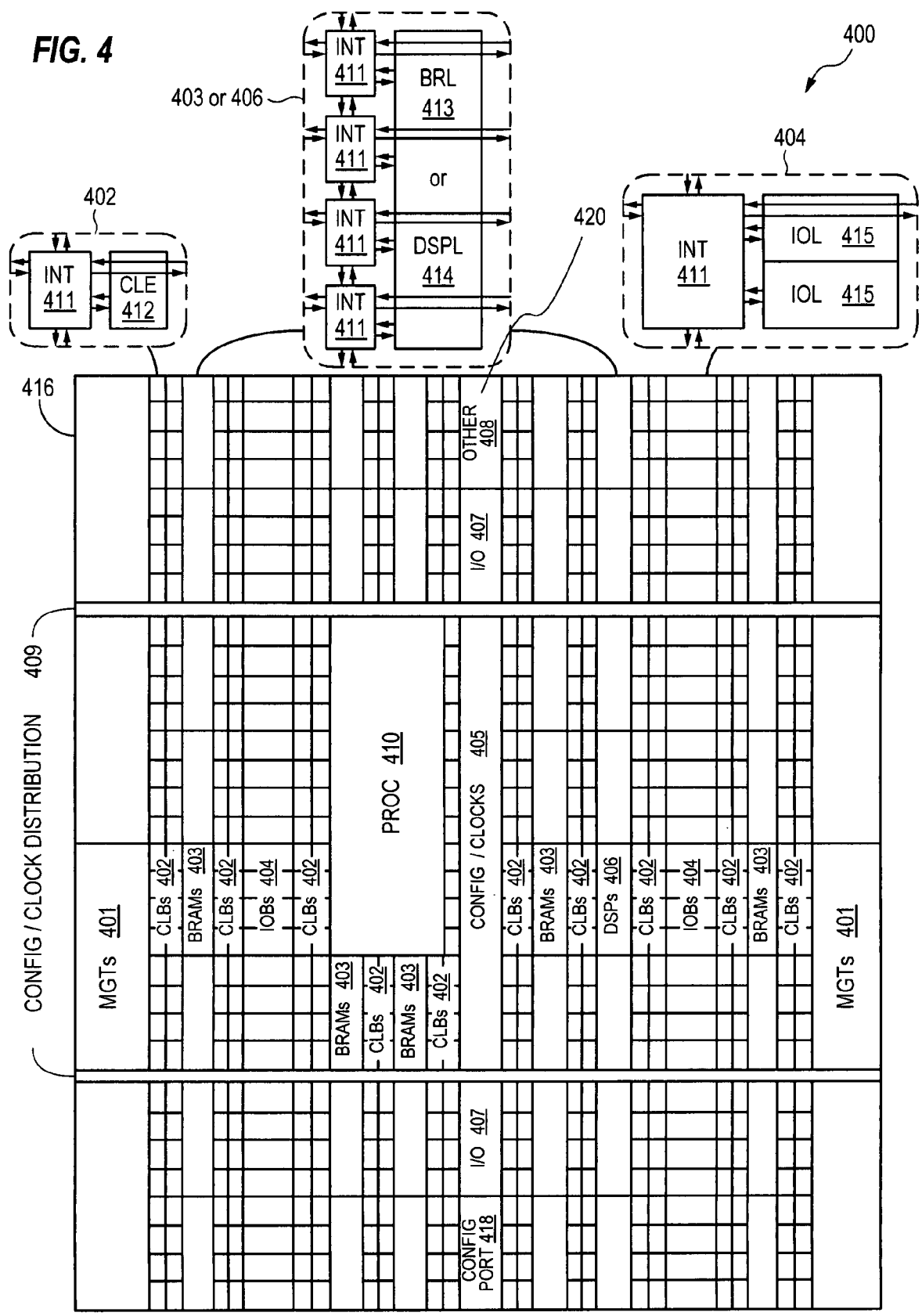
FIG. 4 is a block diagram that illustrates an example field programmable gate array (FPGA) on which an embodiment of the invention may be implemented.

FIG. 4 illustrates a field programmable gate array (FPGA) architecture on which various embodiments of the invention may be implemented. For example, the performance variations may be associated with the configurable logic blocks 402 in the FPGA. For instance, the configuration logic blocks 402 located near the exterior of the FPGA die may be associated with a first performance variation, while the configuration logic blocks 402 located near the center of the FPGA die may be associated with a second performance variation.

Advanced FPGAs can include several different types of programmable logic blocks in the array. The example FPGA 400 that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 can include a configurable logic element (CLE 412) that can be programmed to implement user logic plus a single programmable interconnect element (INT 411). A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element (INT 411). As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a columnar area near the center of the die (420 in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of systems for implementing designs on PLDs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-based method for implementing a design in an integrated circuit, comprising:

storing timing data that represents timing variations between logically-equivalent-programmable resources of the integrated circuit, the timing variations correlated to physical locations of the logically-equivalent-programmable resources;

wherein the integrated circuit is a programmable logic integrated circuit (IC), and the logically-equivalent-programmable resources include configurable logic located on an integrated circuit die of the integrated circuit;

identifying a plurality of groups of logically-equivalent-programmable resources that are each distinguishable from other groups of logically-equivalent-programmable resources with regard to respective timing variations, wherein plurality of groups of logically-equivalent-programmable resources are each defined by a performance parameter;

comparing a respective performance parameter between logically-equivalent-programmable resources of the integrated circuit in the groups;

mapping, placing and routing logic of the design on resources of the integrated circuit, wherein the mapping, placing and routing includes, for an implementation of at least one subset of logic of the design, selecting between logically-equivalent-programmable resources of the integrated circuit based on a result of the step of comparing a respective performance parameter;

excluding, from the mapping, placing and routing any subset of logic of the design, one of the groups that includes one or more of the logically-equivalent-programmable resources that have timing variations exceeding a threshold level;

generating an implementation of the design from the logic of the design placed and routed on the resources of the integrated circuit; and storing the implementation of the design, wherein the comparing, mapping, placing and routing, generating, and storing are performed on a processor.

2. The processor-based method of claim 1, wherein the step of storing performance-variation data includes creating a speed file that contains timing information for the logically-equivalent-programmable resources, the timing information including the performance-variation data.

3. The processor-based method of claim 1, wherein the step of selecting one or more of the logically-equivalent-programmable resources includes the steps of assigning weight factors to the logically-equivalent-programmable resources;

in response to the assigned-weight factors, determining timing-based costs for the logically-equivalent-programmable resources;

in response to the determined-timing-based costs, selecting the logically-equivalent-programmable resources during one of mapping of the design, placement of the design, and routing of the design.

4. The processor-based method of claim 1, wherein the integrated circuit is a field-programmable-logic array (FPGA), the logically-equivalent-programmable resources include configurable logic blocks (CLBs) located on an integrated circuit die of the integrated circuit.

5. The processor-based method of claim 1, further comprising the steps of implementing a performance-based test on a plurality of integrated circuit devices and generating the performance-variation data from results of the performance-based test.

6. The processor-based method of claim 1, further comprising the step of providing a user interface to allow a user to selectively enable use of the performance-variation data.

7. The processor-based method of claim 1, wherein the step of mapping a logic function includes selecting a wide fan-in LUT instead of multiple LUTs based on a result of the step of comparing, and wherein the stored performance-variation data represents interconnection delays.

8. A processor-based method for implementing a design in an integrated circuit, comprising:

storing timing data that represents timing variations between logically-equivalent-programmable resources of the integrated circuit, the timing variations correlated to physical locations of the logically-equivalent-programmable resources;

wherein the integrated circuit is a programmable logic integrated circuit (IC), the logically-equivalent-programmable resources including configurable logic located on an integrated circuit die of the integrated circuit;

identifying a plurality of groups of logically-equivalent-programmable resources that are each distinguishable from other groups of logically-equivalent-programmable resources with regard to respective timing variations, wherein plurality of groups of logically-equivalent-programmable resources are each defined by a performance parameter;

generating a performance-based representation of the design using the stored timing data;

wherein the step of generating includes:

mapping, placing and routing logic of the design on resources of the IC, wherein the mapping, placing and routing includes, for an implementation of at least one subset of logic of the design, selecting between logically-equivalent-programmable resources in the groups based on the performance parameter of the groups; and excluding, from the mapping, placing and routing any subset of logic of the design, one of the groups that includes one or more of the logically-equivalent-programmable resources that have timing variations exceeding a threshold level;

simulating functionality and timing of the design using the generated-performance-based representation of the design; and storing results of the simulating, wherein the identifying, generating, simulating, and storing are performed on a processor.

9. The processor-based method of claim 8, wherein the step of generating the performance-based representation of the design includes the steps of assigning, to each of the logically-equivalent-programmable resources, a standard delay that is common to the logically-equivalent-programmable resources and a delay that is based upon respective timing variations.

10. The processor-based method of claim 8, wherein the step of simulating includes a comparison of the stored results to design constraints.

11. The processor-based method of claim 8, wherein the plurality of groups of logically-equivalent-programmable resources are grouped with regard to respective physical locations of each of the logically-equivalent-programmable resources.

12. The processor-based method of claim 8, wherein the integrated circuit is a field-programmable-logic array (FPGA), the logically-equivalent-programmable resources include configurable logic blocks (CLBs) located on an integrated circuit die of the integrated circuit.

13. The processor-based method of claim 8, further comprising the steps of implementing a timing-based test on a plurality of integrated circuit devices and generating the timing data from results of the performance-based test.

14. The processor-based method of claim 8, further comprising the step of providing a user interface to allow a user to selectively enable use of the timing data.

15. The processor-based method of claim 8, further comprising the step of grouping the logically-equivalent-programmable resources according to a plurality of ranges of timing variations.

16. A processor-based system for implementing a design in an integrated circuit, comprising:

means for storing timing data that represents timing variations between logically-equivalent-programmable resources of the integrated circuit, the timing variations correlated to physical locations of the logically-equivalent-programmable resources;

wherein the integrated circuit is a programmable logic integrated circuit (IC), the logically-equivalent-programmable resources including configurable logic located on an integrated circuit die of the IC;

means for identifying a plurality of groups of logically-equivalent-programmable resources that are each distinguishable from other groups of logically-equivalent-programmable resources with regard to respective timing variations, wherein plurality of groups of logically-equivalent-programmable resources are each defined by a performance parameter;

means for comparing a respective performance parameter between logically-equivalent-programmable resources of the integrated circuit in the groups;

means for mapping, placing and routing logic of the design on resources of the integrated circuit, wherein the mapping, placing and routing includes, for an implementation of at least one subset of logic of the design, selecting between logically-equivalent-programmable resources of the integrated circuit based on a result of the comparing a respective performance parameter;

wherein the means for selecting includes means for excluding, from the mapping, placing and routing any subset of logic of the design, one of the groups that includes one or more of the logically-equivalent-programmable resources that have timing variations exceeding a threshold level;

means for generating an implementation of the design from the logic of the design placed and routed on the resources of the integrated circuit; and means for storing the implementation of the design.

\* \* \* \* \*